United States Patent [19]

Chikarashi

[11] Patent Number: 4,817,516

[45] Date of Patent: Apr. 4, 1989

[54] APPARATUS FOR MANUFACTURING A FOODSTUFF SUITABLE FOR SOYBEAN MILK PRODUCTION

[75] Inventor: Shigeru Chikarashi, Sapporo, Japan

[73] Assignee: Nichii Co., Ltd., Osaka, Japan

[21] Appl. No.: 107,510

[22] Filed: Oct. 9, 1987

[51] Int. Cl.$^4$ .............................................. A23J 1/14
[52] U.S. Cl. ..................................... 99/483; 99/484; 99/548; 99/516
[58] Field of Search ................ 99/483, 484, 516, 467, 99/468, 474, 477, 495, 472, 348, 568, 584, 286, 537, 538, 519; 426/481, 482, 464, 486, 431, 629, 634; 100/176

[56] References Cited

U.S. PATENT DOCUMENTS

| | | | |
|---|---|---|---|
| 3,871,273 | 3/1975 | Hsieh | 99/286 |
| 4,168,657 | 9/1979 | Hildebolt | 99/483 |
| 4,208,476 | 6/1980 | Tsao | 99/483 |
| 4,534,283 | 8/1985 | Nakamuta | 99/468 |
| 4,630,534 | 12/1986 | Tsuchiya et al. | 99/516 |

Primary Examiner—Timothy F. Simone
Attorney, Agent, or Firm—Koda and Androlia

[57] ABSTRACT

The invention relates to an apparatus for producing soybean milk and, more particularly, to a method for manufacturing a foodstuff suitable for soybean milk production and an apparatus for carrying out the method. The apparatus includes a brushing machine for removing earth matter and earth-born germs depositing on material soybean, a band dryer for adjusting the water content of the material soybean so as to facilitate separation of the material into skin and flesh portions, a skin remover for separating the skin portion from the flesh portion and for dividing the flesh portion of each piece of soybean into four to eight parts, and flat pressing rollers for converting the resulting powdery masses into uniformly distributed flaky masses.

3 Claims, 1 Drawing Sheet

APPARATUS FOR MANUFACTURING A FOODSTUFF SUITABLE FOR SOYBEAN MILK PRODUCTION

BACKGROUND OF THE INVENTION

This invention relates to an apparatus for producing soybean milk and, more particularly, to a method for manufacturing a foodstuff suitable for soybean milk production and an apparatus for carrying out the method.

Conventionally, the process of producing soybean milk comprises the steps of washing material soybean, immersing same in water (for 10 to 15 hours in summer time, and 18 to 24 hours in winter time), then grinding same, and boiling and filtering the ground material. In such process, however, the whole work naturally requires much time and labor, and above all the immersion and grinding steps involved considerable difficulties. Indeed, it is no exaggeration to say that producing soybean milk at individual homes has been almost impossible.

SUMMARY OF THE INVENTION

This invention is intended to overcome these difficulties by taking advantage of the fact that a foodstuff suitable for soybean milk production can be obtained by reducing material soybean into a flake form. Accordingly, it is an object of the invention to provide a method and apparatus for manufacturing a foodstuff suitable for soybean milk production which eliminate the use of means for soybean cleaning, immersing, and grinding, thus the whole manufacturing installation being simplified so that the factory space can be most effectively utilized.

It is another object of the invention to provide a method and apparatus for manufacturing a foodstuff suitable for soybean milk production which include a soybean refining stage in which material soybean is brushed and skinned off so that heat resistant germs (such as earth-born germs and sporal germs) which cannot be removed by conventional step of washing the material soybean in water can be completely removed, whereby such foodstuff which is less perishable and highly wholesome can be produced.

It is a further object the invention to provide a method and apparatus for manufacturing a foodstuff suitable for soybean milk production which include a stage for adjusting the water content of the soybean without involving any thermal deterioration in the water soluble protein content thereof and for facilitating separation of the skin portion of the soybean from the flesh portion, whereby soybean flakes as thin as 0.2 mm which has long-term storage life can be obtained.

It is another object of the invention to provide a method and apparatus for manufacturing a foodstuff suitable for soybean milk production which permit production of a product having good body and taste and which also permit production of a bean curd refuse which is far more wholesome than any conventionally available one of the kind and has good color and luster and which is useful as a filler material for various kinds of foodstuffs.

It is a still another object of the invention to provide a method and apparatus for manufacturing a foodstuff suitable for soybean milk production which shorten the process of producing bean curd, fried bean curd, and soybean milk, and which is readily adaptable for demand and planned production, can economize water, electric power, and labor requirements and, more particularly, the cost of waste water treatment.

In order to accomplish the foregoing objects, the apparatus in accordance with the invention comprises a brushing machine connected to a separator for separating dust and the like from material soybean, a band dryer connected to the brushing machine, a skin remover connected to the band dryer, a classifier connected through a separator to the skin remover, and flat pressing rollers connected to the classifier. The brushing machine removes earth matter and earth-born germs depositing on the material soybean. The band dryer adjusts the water content of the soybean material to facilitate separation of the skin portion of the material from the flesh portion thereof. The skin remover divides each piece of soybean into four to eight parts and simultaneously separate the skin portion from the flesh portion. Granules obtained through this separation step are converted into uniformly distributed flakes by the flat pressing rollers.

If the flaky foodstuff (material) thus obtained, after well mixed in water (for 5–10 minutes), is passed through a bean curd separated, then soybean milk is produced. The soybean milk is used to manufacture a bean curd, a fried bean curd, and the like.

At individual homes, it is possible to obtain a household soybean milk by, for example, putting 50 g of the foodstuff (flaky material) into 20 cc of water, boiling same for 3–5 minutes, then subjecting same to filtration.

DETAILED DESCRIPTION OF THE INVENTION

Figure 1:
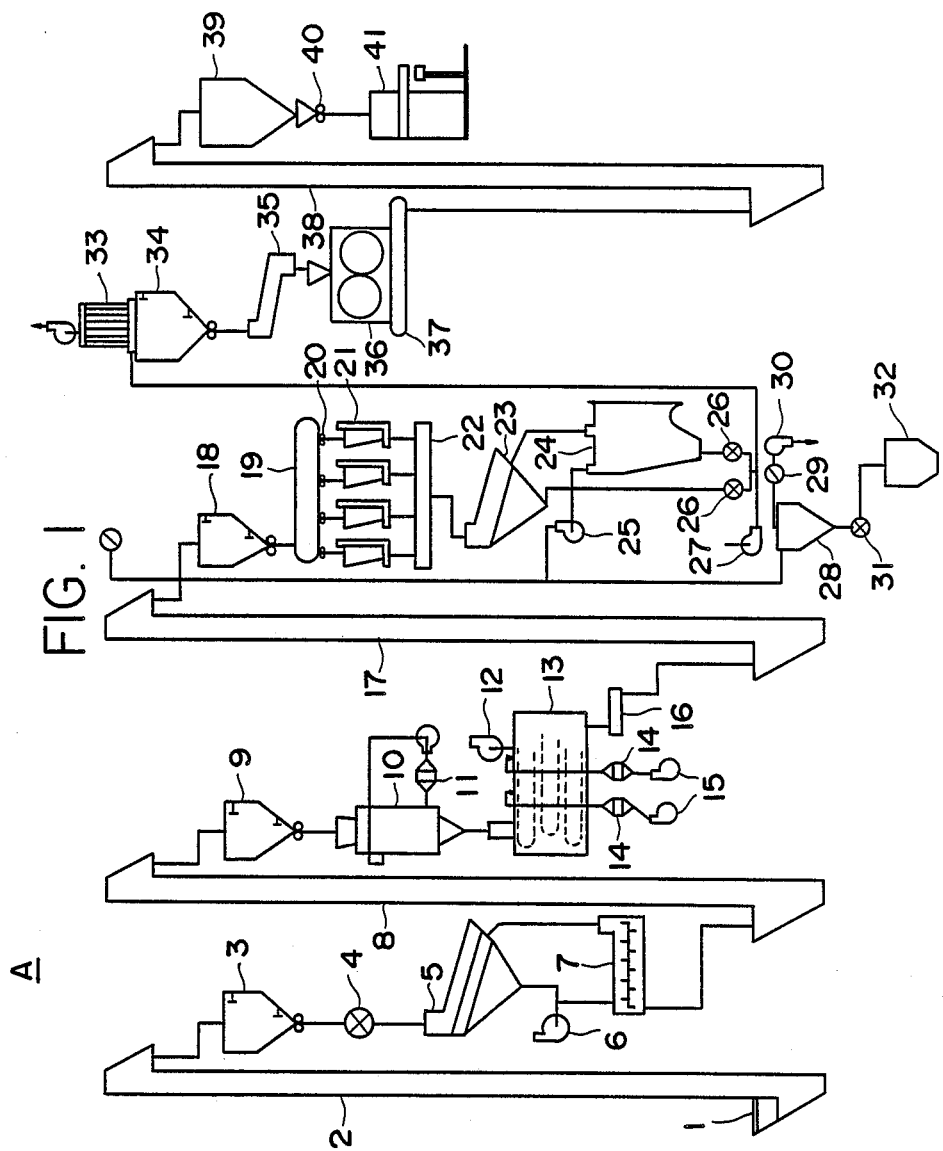
FIG. 1 is a block diagram showing one embodiment of the invention.

One form of embodiment of the invention will now be described with reference to the accompanying drawing.

The manufacturing method of the invention is as follows.

After earth matter and earth born germs depositing on material soybean are removed by brushing, the water content of the material soybean is adjusted so as to facilitate separation of the skin portion of the soybean from the flesh portion thereof. The soybean is then separated into skin portion and flesh portion, and simultaneously the flesh portion of each piece of soybean is divided into four to eight parts. The soybean granules thus obtained is passed through flat-pressing rollers, whereby a product in the form of a mass of uniformly distributed flakes. The adjustment of water content of the soybean facilitates skin/flesh separation and also dries the flesh, so that a product having a low moisture content and good storage stability can be obtained when the flesh is reduced to flakes. Said water content adjustment should be carried out at such temperatures as will not cause any thermal deterioration in the protein content of the soybean.

The manufacturing apparatus in accordance with the invention is as follows.

Reference character A denotes the manufacturing apparatus of the invention. It comprises a brushing machine 7 for brushing off earth matter and earth born germs depositing on material soybean which is connected to a separator for separating dust and the like from the material soybean, a band dryer 13 for adjusting the water content of the material soybean which is connected to the brushing machine 7, a skin remover 21 for dividing each piece of the material soybean into four to eight parts and simultaneously separating the skin portion of the material soybean from the flesh portion thereof which is connected to the band dryer 13, a classifier 24 connected to the skin remover 21 through a separator 23, and a flat-pressing rollers 36 connected to the classifier 24. Operation of the apparatus A will now be explained in detail. Material soybean is introduced through a material inlet port 1 into a stock tank 3 by means of a bucket elevator 2. From the stock tank 3, material soybean is delivered forward in predetermined quantities by a rotary feeder 4. At the separator 5, dust and the like are separated from the material soybean, the dust and the like being removed by a fan 6. Earth matter and earth born germs still depositing on the material soybean are removed at the brushing machine 7, and thereafter the material soybean is passed through a service tank 9 by a bucket elevator 8 and then delivered to a preheating dryer 10 and a band dryer 13, both of which dryers are kept constantly at 55° C. so that some of the water content of the material soybean is removed. The amount of water removal at this stage can be adjusted by regulating the rotational speed of the band drier 13. The material whose water content has thus been adjusted is delivered to a bucket elevator 17 for being stored in a storage tank 18, from which the material is delivered in predetermined quantities through a slide gate onto an 0 type chain conveyor and then delivered in predetermined quantities through slide gates 20 provided at four locations to the skin remover 21, at which the material is divided into skin and flesh portions and at which the flesh portion is divided into four to eight parts. The so separated and divided masses of the material are delivered by a screw conveyor 22 to a separator 23, at which powdery masses are separated from granular masses. The granular masses are delivered to the classifier 24, where they are again separated into granular masses and powdery masses, the powdery masses being removed by a blower 25 for delivery into a skin storage tank 32 through a cyclone 28. The remaining granular masses are delivered into a storage tank 34 through a fan 27. From the storage tank 34, the granular masses are fed in a predetermined flow and in a uniformly scattered form by a oscillatory feeder 35 for passage through flat pressing rollers. Thus, a product in a flaky form of 0.2 m/m–0.4 m/m is continuously produced, the product being dropped onto a belt conveyor 37 and then delivered by a bucket elevator 38 to a product tank 39. By opening a slide gate 40, the product is fed to an automatic dispenser 41, by which it is packed into a packaged form of product.

The flaky foodstuff (material) suitable for soybean milk production thus produced can be subsequently sold to bean our manufactures and, after being suitably repackaged, for house-hold use.

What is claimed is:

1. An apparatus for manufacturing a foodstuff suitable for soybean mild production comprising a separator for separating dust and the like from soybean material, a brushing machine coupled to an output of the separator for receiving the soybean material from the separator and for brushing the soybean material, a band dryer connected to an output of the brushing machine for adjusting a water content of the soybean material, a skin remover connected to an output of the band dryer for removing skin from the soybean material, a classifier connected to an output of the skin remover for separating granular masses from powdery masses of the soybean material, and flat pressing rollers connected to an output of the classifier for receiving granular masses and for pressing the granular masses into flat flakes.

2. An apparatus for manufacturing a foodstuff suitable for soybean milk production as set forth in claim 1, wherein the brushing machine is designed to remove earth matter and earth born germs depositing on the soybean material.

3. An apparatus for manufacturing a foodstuff suitable for soybean milk production as set forth in claim 1, wherein the skin remover further divides each piece of the soybean material into four to eight parts.

* * * * *